United States Patent Office 3,489,748
Patented Jan. 13, 1970

3,489,748
16α-THIO-9β,10α-Δ⁴-PREGNENE - 3 - ONES AND INTERMEDIATES IN THE PREPARATION THEREOF
Hans Els, Binningen, Andor Fürst, Basel, and Marcel Müller, Frenkendorf, Switzerland, assignors to Hoffmann-La Roche Inc., Nutley, N.J., a corporation of New Jersey
No Drawing. Filed Aug. 30, 1967, Ser. No. 664,251
Claims priority, application Switzerland, Sept. 8, 1966, 13,020/66
Int. Cl. C07c *169/34, 173/00;* A61k *17/06*
U.S. Cl. 260—239.55
29 Claims

ABSTRACT OF THE DISCLOSURE

16α-thio-9β,10α-Δ⁴-pregnen-3-ones useful in the control of fertility.

---

This invention relates to a compound of the formula

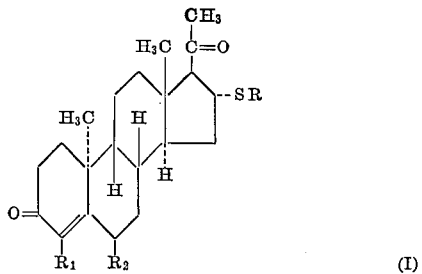

or a corresponding Δ¹-dehydro, Δ⁶-dehydro or Δ¹,⁶-bisdehydro compound; wherein R is hydrogen, cyano, alkyl, ar-hydrocarbyl, ar-hydrocarbyl-alkyl, mono-unsaturated alkyl, alkanoyl, a 5- or 6-membered heterocyclic moiety or a moiety of the formula —alk—X—$R_3$; alk is alkylene; X is oxygen or sulfur; $R_3$ is hydrogen or alkyl; and $R_1$ and $R_2$ is each independently hydrogen, alkyl or halogen.

As used herein the term "alkyl" includes both straight and branched chain saturated hydrocarbon moieties, such as methyl, ethyl, propyl, isopropyl, butyl or isobutyl, octyl, decyl, dodecyl, or octadecyl. The term "mono-unsaturated alkyl" includes both alkenyl anad alkynyl moieties, such as vinyl, allyl, methallyl, ethynyl or propargyl. The term "alkanoyl" includes moieties derived from alkane carboxylic acids, such moieties being, for example, acetyl, propionyl, butyryl, valeryl or capryl. The term "arhydrocarbyl" includes phenyl and alkyl-substituted phenyl moieties such as tolyl. Halogen includes all four halogens such as chlorine, bromine, fluorine and iodine. Exemplary 5- or 6-membered heterocyclic moieties are thenyl, thienyl, 2-imidazolyl, 3(1H-1,2,4-triazolyl) and 2-(4-hydroxypyrimidyl). Alkyl, alkenyl, alkinyl or alkanoyl groups, if present are preferably lower alkyl, lower alkenyl, lower alkinyl or lower alkanoyl groups containing up to 6 carbon atoms.

The compounds of Formula I can be prepared from a compound of the formula

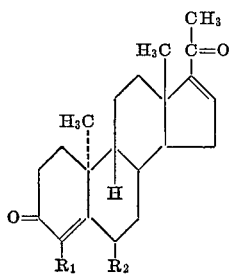

or a Δ⁶-dehydro derivative thereof; wherein $R_1$ and $R_2$ have the same meaning as above, by treatment thereof with a compound of the formula R—SH (in which R has the same meaning as above). If not already present in the starting material, a double bond can be introduced into the reaction product between the 6-position and the 7-position, and/or can be introduced between the 1-position and 2-position.

The reaction of a compound of Formula II with the compound of the formula R—SH can be brought about by mixing the two reaction partners in a suitable solvent. An excess of the thio-compound can serve as the solvent if desired. The reaction can be effected at room temperature or below, or the reaction mixture can also be heated if necessary. The reaction is preferably effected in the presence of an acid or a base which will function as a catalyst and can also function as the solvent. Organic bases such as piperidine, pyridine or collidine are suitable as bases for this purpose. Suitable acids are, for example, mineral acids such as hydrochloric acid or organic acids, especially sulfonic acids such as p-toluenesulfonic acid.

When using the 6-dehydro derivative of a compound of Formula II as the starting material, after the introduction of the substituent R into the 16-position, in addition of the compound R—SH at the 6,7-double bond can also occur. In this case, in order to optimize yields, the course of the reaction is conveniently followed in a suitable manner (e.g., by analysis of the reaction mixture, for example, by means of thin layer chromatography) and the reaction is discontinued as soon as the analysis shows the presence of 7,16-disubstituted product.

Insofar as they are not already present, double bonds can be introduced at the 1- and/or 6-position into the compounds of Formula I. This can be done according to methods which are known for this operation in steroids of the normal (i.e., 9α,10β) series. A suitable method for the introduction of a Δ⁶-double bond is, for example, treatment with chloranil in amyl alcohol. A Δ¹-double bond can, for example, be introduced by treatment with dichlorodicyanobenzoquinone in the presence of a small amount of p-toluenesulfonic acid or a small amount of hydrochloric acid. The starting compounds of Formula II above, insofar as they are not known, can be prepared in a manner known per se. Compounds of Formula II, wherein $R_1$ is alkyl, can be prepared, e.g., by treating a corresponding, 4-unsubstituted compound with an alkyl halide in the presence of potassium tert.-butylate in tert. butanol. Compounds of Formula II, wherein $R_1$ is halogen, can be prepared by halogenating corresponding 4-unsubstituted compounds. Thus, a 4-chloro compound of Formula II can be obtained by treating a 9β,10α-pregna-4,16-diene-3,20-dione or its 1-dehydro or 1,16-bisdehydro derivative with sulfuryl chloride. A 4-bromo compound of Formula II can be obtained by treatment of a 9β,10α-pregna-4,16-diene-3,20-dione or its 1-dehydro or 1,6-bisdehydro derivative with bromine in dimethyl formamide. A 4-fluoro compound of Formula II can be prepared by conversion of a 9β,10α-pregna-4,16-diene-3,20-dione into a 3-pyrrolidyl enamine and treatment of the latter with perchloryl fluoride. A compound of Formula II wherein $R_2$ represents halogen can be prepared as follows: A 16α - acetoxy-9β,10α-pregna-4,6-diene-3,20-dione is reacted with chromyl chloride. The 6-chloro-7-hydroxy derivative thus obtained is dehydrated by treatment with hydrogen chloride in dioxan. Subsequently, the 16α-acetoxy group is splitted off by azeotropic destillation with benzene in the presence of p-toluene sulfonic acid thus introducing the Δ¹⁶ double bond. A 6-chloro-, bromo- or fluoro atom can further be introduced by converting a 16α - acetoxy-9β,10α-pregn-4-ene-3,20- dione into a 3-enol acetate by treatment with isopropenyl acetate in the presence of p-toluene sulfonic acid and reacting said 3-enol acetate with N-chloro or N-bromo succinimide or with perchlory fluoride. The 16α-acetoxy group is then splitted off to give the desired 6-halo derivative of Formula II. Compounds of Formula II, wherein $R_2$ represents alkyl can be prepared as follows: A 9β,10α-pregna-4,16-diene-3,20-dione is converted into a 3,6,20- triketone by means of chromic acid oxidation. The 3,6,20-triketone is partially ketalized in the positions 3 and 20, e.g. by treatment with ethylene glycol and ethyl orthoformate in the presence of p-toluene sulfonic acid. The 3,20-protected triketone is submitted to a Wittig reaction with an alkylidenephosphorane. The protecting groups are splitted off from the reaction product by treatment with an acid to give a 6-alkylidene-9β,10α-pregna-4,16-diene-3,20-dione which can either by hydrogenated to give the corresponding 6-alkyl derivative or isomerized, e.g. by treatment with palladium/carbon in ethanol to give a 6-alkyl-9β,10α-pregna-4,6,16-triene-3,20-dione.

The compounds of Formula I are endocrinologically useful as progestational agents and are useful in the control of fertility. In particular they influence the physiological precesses which are controlled by sex hormones; for example, the compounds of Formula I are useful as sperm immobilizers. Their progestational activities are manifested upon administration in oral dosage of from about 0.01 mg./kg. to about 0.05 mg./kg. or in parenteral dosage of from about 0.001 mg./kg. to about 0.005 mg./kg. to juvenile female rabbits after estrogen priming, which thereupon respond with proliferation of the endometrium (Clauberg test). Further evidence of their progestational activities is the production of deciduomata in pseudopregnant rats after castration (elimination of endogenous progesterone source) in doses of from about 0.005 mg./kg. to about 0.02 mg./kg. by the parenteral, or of from about 0.05 to about 0.2 mk./kg. by the oral route. In similar doses, certain compounds of Formula I produce so marked a thickening of the cervico-vaginal mucus of normally cycling adult female rats that the mucus cannot be smeared on a microscope slide, but remains a viscous clump. Such mucus shows metachromatic properties when stained with methylene blue, indicating biochemical alterations.

The compounds of Formula I can be administered internally, for example, orally or parenterally, in the form of conventional pharmaceutical preparations which contain them in admixture with conventional pharmaceutical organic or inorganic carrier materials suitable for enteral or parenteral administration, such as, for example, water, gelatin, lactose, starch, magnesium stearate, talc, vegetable oils, gums, polyalkyleneglycols, Vaseline, ect. The pharmaceutical preparations can be administered in conventional solid forms, such as tablets, dragées, suppositories, capsules, or in conventional liquid forms such as solutions, suspensions or emulsion. They can be submitted to conventional pharmaceutical processes such as sterilization and/or contain conventional pharmaceutical additives such as preservatives, stabilizing agents, wetting agents, emulsifying agents, salts for the adjustment of osmotic pressure or buffers. They can also contain other pharmaceutically additive ingredients. Dosages of the active ingredient should be adjusted to individual needs in accordance with the condition being treated or the pharmaceutical effect sought. Suitable dosage regimens range from about 0.01 to about 1.0 mg./kg. of body weight. They are preferably provided in pharmaceutical formulations containing 1 to 5 mg. as a unit dosage.

The following examples are illustrative but not limitative of the invention. All temperatures are stated in degrees centigrade.

EXAMPLE 1

A mixture of 70.0 g. of 9β,10α-pregna-4,6,16-triene-3,20-dione, 700 ml. of ethyl mercaptan and 140 ml. of piperidine is heated to reflux for 15 minutes. The reaction solution is subsequently evaporated to dryness in water-jet vacuum and the residue chromatographed on silica gel. With petroleum ether-ether (1:1), there is eluted 55 g. of 16α-ethylthio-9β,10α-pregna-4,6-diene-3,20-dione. Melting point 117–118° (acetone/hexane); $\epsilon_{284}$=26,500; $[\alpha]_D^{25}$=—534° (in dioxane).

EXAMPLE 2

A solution of 4.0 g. of 9β,10α-pregna-4,6,16-triene-3,20-dione in 50 ml. of methyl mercaptan and 2 ml. of piperidine is stirred at 0° for 5 minutes. The reaction mixture is concentrated to dryness in vacuum; the residue is dissolved in petroleum ether/ether (1:1) and the solution filtered through silica gel yielding 4.0 g. of chromatographically pure 16α-methylthio-9β,10α-pregna-4,6-diene-3,20-dione which after recrystallization from methylene chloride/isopropyl ether melts at 136–137°. $\epsilon_{284}$=27,400; $[\alpha]_D^{25}$=—534° (in dioxane).

EXAMPLE 3

According to the method described in Example 1, from 9β,10α-pregna-4,6,16-triene-3,20-dione and isoproply mercaptan there is obtained 16α-isopropylthio-9β,10α-pregna-4,6-diene-3,20-dione, melting point 119–120° (acetone/hexane). $\epsilon_{284}$=27,200; $[\alpha]_D^{25}$=—532° (in dioxane).

EXAMPLE 4

From 9β,10α-pregna-4,6,16-triene-3,20-dione and n-propyl mercaptan there is obtained in accordance with the procedure of Example 1, 16-α-n-propylthio-9β,10α-pregna-4,6-diene-3,20-dione. Melting point 122–125°. $\epsilon_{284.5}$=25,600; $[\alpha]_D^{25}$=—540° (in chloroform).

EXAMPLE 5

From 9β,10α-pregna-4,6,16-triene-3,20-dione and n-butyl mercaptan there is obtained in accordance with the procedure of Example 1, 16α-n-butylthio-9β,10α-pregna-4,6-diene-3,20-dione. Melting point 141–143°.

$\epsilon_{284.5}$=26,400

$[\alpha]_D^{25}$=—540° (in chloroform).

EXAMPLE 6

A mixture of 2.0 g. of 9β,10α-pregna-4,6,16-triene-3,20-dione, 60 ml. of benzene, 4 ml. of allyl mercaptan and 1 ml. of piperidine is stirred at room temperature for 3½ hours. A further 10 ml. of allyl mercaptan is thereafter added and the reaction mixture is stirred for a further 5 hours. After standing at 0° for several hours, the mixture is concentrated to dryness in vacuum and the residue chromatographed on silica gel. With methylene chloride/acetone (99:1) there is eluted 1.9 g. of 16α-allylthio-9β,10α-pregna-4,6-diene-3,20-dione. Melting point 98–100° (ether/hexane). $\epsilon_{285}$=26,100; $[\alpha]_D^{25}$=—522° (in dioxane).

EXAMPLE 7

A solution of 3.0 g. of 9β,10α-pregna-4,6,16-triene-3,20-dione in 60 ml. of benzyl mercaptan and 3 ml. of piperidine is heated at 50° for 15 minutes. The reaction mixture is worked up according to the procedure of Example 1 and yields 2.7 g. of 16α-benzylthio-9β,10α-pregna - 4,6 - diene - 3,20 - dione, melting point 158–160° (ether). $\epsilon_{284}$=25,000; $[\alpha]_D^{25}$=—487° (in dioxane).

EXAMPLE 8

A mixture of 3.0 g. of 9β,10α-pregna-4,6,16-triene-3,20-dione, 300 ml. of benzene, 12 ml. of thiophenol and 1.5 ml. of piperidine is stirred at room temperature for 75 minutes. The reaction mixture is diluted with 200 ml. of petroleum ether and chromatographed on silica gel. The petroleum ether/ether (2:1) eluates yield 16α-phenylthio-9β,10α-pregna-4,6-diene-3,20-dione, melting point 198–200°. $\epsilon_{283}=26,500$; $[\alpha]_D^{25}=-587°$ (in dioxane).

EXAMPLE 9

For 90 minutes, a stream of hydrogen sulfide is passed through a solution containing 2.30 g. of 9β,10α-pregna-4,6,16-triene-3,20-dione and 6 drops of piperidine in 60 ml. of pyridine. The reaction mixture is then concentrated in vacuum and the residue chromatographed on silica gel. The ether/petroleum ether (1:1) eluates yield 16α-mercapto-9β,10α-pregna-4,6-diene-3,20-dione which is recrystallized from ether; melting point 130–135° (with 0.5 mol of ether); $\epsilon_{283}=24,200$; $[\alpha]_D^{25}=-453°$ (in dioxane).

EXAMPLE 10

A solution of 1.5 g. of 9β,10α-pregna-4,6,16-triene-3,20-dione in 15 ml. of 2-thioethanol is held at 0° for 2 hours. It is then poured on ice-water, extracted with methylene chloride and washed neutral with water. The extract, after being dried with sodium sulphate, is evaporated to dryness and yields 2.2 g. of crude product which is chromatographed on silica gel. With ether there is eluted 16α-(2-hydroxyethyl)-thio-9β,10α-pregna-4,6-diene. Melting point 171–172° (methylene chloride/isopropyl ether). $\epsilon_{284}=27,200$; $[\alpha]_D^{25}=-514°$ (in dioxane).

EXAMPLE 11

A solution of 2.8 g. of 16α-ethylthio-9β,10α-pregna-4,6-diene-3,20-dione and 2.8 g. of 2,3-dichloro-5,6-dicyanobenzoquinone in 120 ml. of absolute dioxane is heated to reflux for 10 hours. To the mixture is then added 100 ml. of benzene and it is then filtered through a column of 60 g. of aluminum oxide (activity II). The product is finally completely eluted with benzene. The crude product obtained by evaporation of the solvent is chromatographed on silica gel with petroleum ether/ether. The fractions which are uniform according to thin layer chromatogram are combined and recrystallized from acetone/hexane yielding 16α-ethylthio-9β,10α-pregna-1,4,6-triene-3,20-dione, melting point 112–113°. $\epsilon_{222}=14,000$; $\epsilon_{250}=10,200$; $\epsilon_{302}=13,200$; $[\alpha]_D^{25}=-388°$ (in dioxane).

EXAMPLE 12

A solution of 1.0 g. of 9β,10α-pregna-4,6,16-triene-3,20-dione in 20 ml. of thioacetic acid is held at 5° for 15 minutes. The mixture is then poured on ice-water and extracted with ether. The ether extract is successively washed with dilute caustic soda and several times with water, dried with sodium sulfate and evaporated to dryness. The residue is chromatographed on 50 g. of silica gel. The ether eluates yield 16α-acetylthio-9β-10α-pregna-4,6-diene-3,20-dione, melting point 135° (acetone/hexane). $\epsilon_{284}=27,400$; $\epsilon_{233}=6,800$; $[\alpha]_D^{25}=-617°$ (in dioxane.

EXAMPLE 13

A mixture of 2.0 g. of 9β,10α-pregna-4,6,16-triene-3,20-dione, 120 ml. of glacial acetic, 4.0 g. of potassium rhodanide and 4.0 ml. of concentrated hydrochloric acid is stirred at room temperature for 3 hours. It is then poured on ice-water and extracted with methylene chloride. The extracts (which are washed neutral with sodium bicarbonate solution and water, yield 2.3 g. of crystalline crude product which for purification is chromatographed on silica gel. The ether/petroleum ether (3:2) fractions yield 1.2 g. of 16α-cyanothio-9β,10α-pregna-4,6-diene-3,20-dione, melting point 222–223° (acetone/hexane). $\epsilon_{284}=26,500$; $[\alpha]_D^{25}=-622°$ (in dioxane).

EXAMPLE 14

1 g. of 9β,19α-pregna-4,6-triene-3,20-dione is dissolved in 5 ml. of dioxane and treated with 5 ml. of dithioglycol monomethyl ether. After 20 minutes at 25°, no more starting material is demonstrable by thin layer chromatogram. The reaction solution is then taken up in 150 ml. of acetic esters extracted twice with 2 N NaOH and washed neutral with water yielding 1.58 g. of crude product which is chromatographed on 30 g. of silica gel in the system methylene chloride/acetic ester (5 ml. of fractions). Fractions 85–137 contain 0.5 g. of an oil which is obtained from isopropyl ether, on addition of pentane, as a semi-crystalline precipitate being 16α-(2'-methylthio-ethylthio)-9β-10α-pregna-4,6-diene-,3,20-dione which melts at 125°. $\epsilon_{284}=20,700$; $[\alpha]_{589}^{25}=-342°$.

EXAMPLE 15

A mixture of 375 mg. of 6-chloro-9β,10α-pregna-4,6,16-triene-3,20-dione, 20 ml. of ethyl mercaptan and 0.3 ml. of piperidine is stirred at 5° for 60 minutes. After workup according to the procedure of Example 1, there is obtained 6-chloro-16α-ethylthio-9β,10α-pregna-4,6-diene-3,20-dione, melting point 157–158° (ether).

$\epsilon_{287}=22,200$; $[\alpha]_D^{25}=-384°$ (in dioxane)

The starting material is obtained as follows:

A mixture of 27 g. of chromyl chloride and 200 ml. of methylene chloride is added dropwise with stirring within 30 minutes to a solution of 19.8 g. of 16α-acetoxy-9β,10α-pregna-4,6-diene-3,20-dione in 1000 ml. of methylene chloride which is cooled to −20°. The mixture is subsequently stirred at −20° for a further 2 hours. The precipitate which separates out is filtered off and immediately stirred into a well stirred solution of 100 g. of sodium acetate and 124 g. of sodium pyrosulphite in 3000 ml. of ice-water. After the addition of 3000 ml. of ethyl acetate, the mixture is stirred for a further 20 minutes. The organic phase is then separated off, washed with 10% sodium acetate solution and sodium chloride solution, dried over sodium sulphate and the solvent evaporated in vacuum. The crude product (15.1 g.) is dissolved in 75 ml. of methylene chloride and 270 ml. of dioxane and, after the addition of 35 ml. of dioxane containing 10% hydrochloric acid gas, the solution is stirred for a further 1½ hours. The reaction mixture is then evaporated to dryness and taken up in ethyl acetate. The ethyl acetate solution is washed with sodium bicarbonate solution and water and evaporated. There is obtained 14.8 g. of crude product which is chromatographed on silica gel. With benzene/ethyl acetate (8:1) there is eluted 4.5 g. of amorphous 16α-acetoxy-6-chloro-9β,10α-pregna-4,6-diene-3,20-dione.

1.8 g. of the latter amorphous substance and 180 mg. of p-toluene-sulphonic acid are dissolved in 110 ml. of benzene. This solution is heated to reflux in a vessel connected to a water-separator for 2 hours. After cooling, 0.1 ml. of pyridine and 150 ml. of ether are added to the reaction solution. The precipitate which separates is filtered off and the filtrate evaporated to dryness. The residue is chromatographed on silica gel. With petroleum ether/ether (1:1) there is eluted 6-chloro-9β,10α-pregna-4,6,16-triene-3,20-dione, melting point 170–171° (acetone/hexane). $\epsilon_{237.5}=13,900$; $\epsilon_{287}=21,600$; $[\alpha]_D^{25}=-277°$ (in dioxane).

EXAMPLE 16

A solution of 3.45 g. of 4-chloro-9β,10α-pregna-4,6,16-triene-3,20-dione in a mixture of 35 ml. of benzene and 56 ml. of ethyl mercaptan is treated with 1 ml. of piperidine. The mixture is allowed to stand at 15° for 48 hours, diluted with ether and the solution then washed with dilute hydrochloric acid, sodium bicarbonate solution and water. After evaporation of the solvent, the residue is chromatographed on silica gel. There is obtained 1.87 g. of chromatographically pure 4-chloro-16α-ethylthio-9β,10α-pregna-4,6-diene-3,20-dione which is recrystallized from ether. Melting point 159–162°. $\epsilon_{296}=23,100$; $[\alpha]_D^{25}=502$ (in chloroform).

The starting material is obtained as follows:

2.75 ml. of sulphuryl chloride is added with stirring within 5 minutes to a solution of 5.0 g. of 9β,10α-pregna- 4,6,16-triene-3,20-dione in 120 ml. of dimethylformamide which is cooled to 10°. The mixture is subsequently stirred at room temperature for a further 30 minutes, poured on ice-water and extracted with methylene chloride. The organic layer is washed with diluted hydrochloric acid, sodium bicarbonate solution and water and evaporated. Chromatography of the residue on silica gel yields 4-chloro-9β,10α-pregna-4,6,16-triene-3,20-dione which is recrystallized from ether. Melting point 190–191°. $\epsilon_{236}=10,600$; $\epsilon_{297}=23,200$; $[\alpha]_D^{25}=-413°$ (in dioxane).

EXAMPLE 17

A mixture of 5.0 g. of 9β,10α-pregna-4,6,16-triene-3,20-dione, 100 ml. of benzene, 30 ml. of propargyl mercaptan and 2.5 ml. of piperidine is stirred at 0° under nitrogen for 3½ hours. The reaction mixture is then evaporated to dryness in vacuum and the residue chromatographed on silica gel. With petroleum ether/ether (1:1) there is eluted 3.9 g. of 16α-(2-propynylthio)-9β,10α-pregna-4,6-diene-3,20-dione. Melting point 188–190° (from acetone/isopropyl ether). $\epsilon_{284}=25,500$; $[\alpha]_D^{25}=-536°$ (in dioxane).

EXAMPLE 18

From 9β,10α-pregna-4,6,16-triene-3,20-dione and n-octyl-mercaptane there is obtained in accordance with the procedure of Example 1, the oily 16α-n-octylthio-9β,10α - pregna - 4,6-diene - 3,20 - dione, $\epsilon_{284}=27,100$; $[\alpha]_D^{25}=-453°$ (in dioxane).

EXAMPLE 19

From 9β,10α-pregna-4,6,16-triene-3,20-dione and n-octadecylmercaptane there is obtained in accordance with the procedure of Example 1, 16α-n-octadecylthio-9β,10α-pregna-4,6-diene-3,20-dione. $\epsilon_{284}=26,800$; $[\alpha]_D^{25}=-343°$ (in dioxane).

EXAMPLE 20

A mixture of 2.0 g. of 9β,10α-pregna-4,6,16-triene-3,20-dione, 40 ml. of benzene, 10 ml. of furfuryl mercaptan and 0.8 ml. of piperidine is stirred at room temperature in a nitrogen atmosphere for one hour. The reaction solution is subsequently evaporated to dryness in water-jet vacuum and the residue is chromatographed on silica gel. With ether/hexane (1:1) there is eluted 2.2 g. of 16α-furfurylthio-9β,10α-pregna - 4,6 - diene - 3,20-dione. Melting point 144–145° (acetone/hexane); $\epsilon_{222}=12,100$; $[\alpha]_D^{25}=-481°$ (in dioxane).

EXAMPLE 21

The following ingredients are mixed together and then formed into tablets containing that indicated amount of each ingredient:

| | Mg. |
|---|---|
| 16α-ethylthio-9β,10α-pregna-4,6-diene - 3,20-dione | 5 |
| Lactose | 71 |
| Corn starch | 71 |
| Talc | 2.7 |
| Magnesium stearate | 0.3 |

What is claimed is:
1. A compound selected from the group consisting of compounds of the formulae

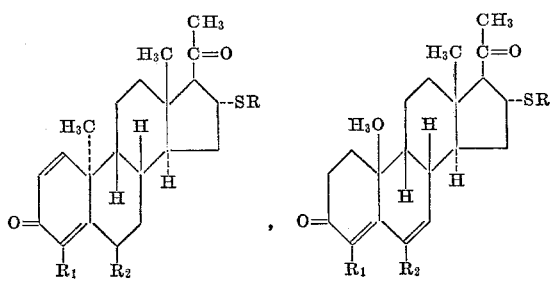

and

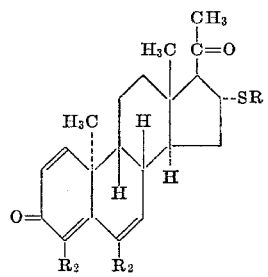

wherein R is hydrogen, cyano, alkyl, ar-hydrocarbyl, ar-hydrocarbyl alkyl, mono-unsaturated alkyl, alkanoyl, a 5- or 6-membered heterocyclic moiety or a moiety of the formula —alk—X—$R_3$ wherein alk is alkylene, X is oxygen or sulfur, $R_3$ is hydrogen or alkyl; $R_1$ and $R_2$ is each independently hydrogen alkyl or halogen provided however that when one of $R_1$ or $R_2$ is alkyl the other is not alkyl.

2. A compound as in claim 1 which is of the formula

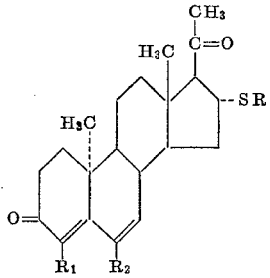

wherein R, $R_1$, and $R_2$ have the same meaning as in claim 1.

3. A compound as in claim 2 wherein $R_1$ and $R_2$ are each hydrogen and R is lower alkyl.

4. A compound as in claim 3 which is 16α-methylthio-9β,10α-pregna-4,6-diene-3,20-dione.

5. A compound as in claim 3 which is 16α-ethylthio-9β,10α-pregna-4,6-diene-3,20-dione.

6. A compound as in claim 3 which is 16α-n-propylthio-9β,10α-pregna-4,6-diene-3,20-dione.

7. A compound as in claim 3 which is 16α-isopropylthio-9β,10α-pregna-4,6-diene-3,20-dione.

8. A compound as in claim 3 which is 16α-n-butylthio-9β,10α-pregna-4,6-diene-3,20-dione.

9. A compound as in claim 2 which is 16α-mercapto-9β,10α-pregna-4,6-diene-3,20-dione.

10. A compound as in claim 2 which is 16α-cyanothio-9β,10α-pregna-4,6-diene-3,20-dione.

11. A compound as in claim 2 which is 16α-ethylthio-6-chloro-9β,10α-pregna-4,6-diene-3,20-dione.

12. A compound as in claim 2 which is 16α-ethylthio-4-chloro-9β,10α-pregna-4,6-diene-3,20-dione.

13. A compound as in claim 2 which is 16α-phenylthio-9β,10α-pregna-4,6-diene-3,20-dione.

14. A compound as in claim 2 which is 16α-n-octylthio-9β,10α-pregna-4,6-diene-3,20-dione.

15. A compound as in claim 2 which is 16α-n-octadecylthio-9β,10α-pregna-4,6-diene-3,20-dione.

16. A compound as in claim 2 wherein $R_1$ and $R_2$ are each hydrogen and R is monounsaturated lower alkyl.

17. A compound as in claim 16 whch is 16α-allylthio-9β,10α-pregna-4,6-diene,3,20-dione.

18. A compound as in claim 16 which is 16α-(2'-propynyl)thio-9β,10α-pregna-4,6-diene-3,20-dione.

19. A compound as in claim 2 which is 16α-benzylthio-9β,10α-pregna-4,6-diene-3,20-dione.

20. A compound as in claim 2 which is 16α-(2'-methylthioethyl)thio-9β,10α-pregna-4,6-diene-3,20-dione.

21. A compound as in claim 2 which is 16α-(2'-hydroxyethyl)thio-9β,10α-pregna-4,6-diene-3,20-dione.

22. A compound as in claim 2 which is 16α-acetylthio-9β,10α-pregna-4,6-diene-3,20-dione.

23. A compound as in claim 1 which is 16α-ethylthio-9β,10α-pregna-1,4,6-triene-3,20-dione.

24. A compound as in claim 2 wherein $R_1$ and $R_2$ are each hydrogen and R is a 5-membered heterocyclic moiety.

25. A compound as in claim 24 which is 16α-furfurylthio-9β,10α-pregna-4,6-diene-3,20-dione.

26. A compound of the formula

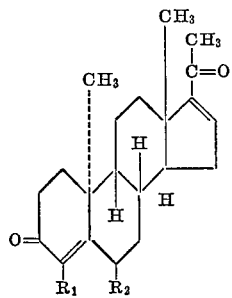

or a Δ⁶-dehydro-derivative thereof, wherein $R_1$ and $R_2$ are hydrogen, halogen or alkyl with the proviso that at least one of $R_1$ and $R_2$ is other than hydrogen and further that when one of $R_1$ or $R_2$ is alkyl the other is not alkyl.

27. A compound as in claim 26 which is 6-chloro-9β,10α-pregna-4,6,16-triene-3,20-dione.

28. A compound as in claim 26 which is 4-chloro-9β,10α-pregna-4,6,16-triene-3,20-dione.

29. 16α - acetoxy - 6 - chloro - 9β,10α - pregna-4,6-diene-3,20-dione.

References Cited

UNITED STATES PATENTS 3,196,149   7/1965   Weiss et al. _____ 260—239.5

OTHER REFERENCES

Nakanishi: J. Med. Chemistry, November 1963, p. 798, relied on.

ELBERT L. ROBERTS, Primary Examiner

U.S. Cl. X.R.

260—239.5, 397.3, 397.4; 424—242

PO-1050
(5/69)

UNITED STATES PATENT OFFICE
CERTIFICATE OF CORRECTION

Patent No. 3,489,748     Dated January 13, 1970

Inventor(s) __Els, Furst and Miller__

It is certified that error appears in the above-identified patent and that said Letters Patent are hereby corrected as shown below:

Claim 1,     Column 8,     Line 13

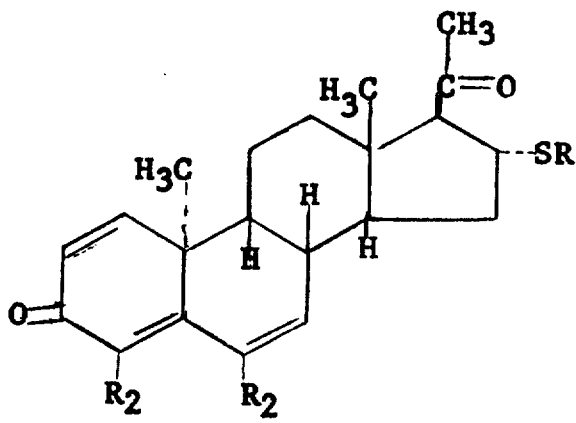

should be

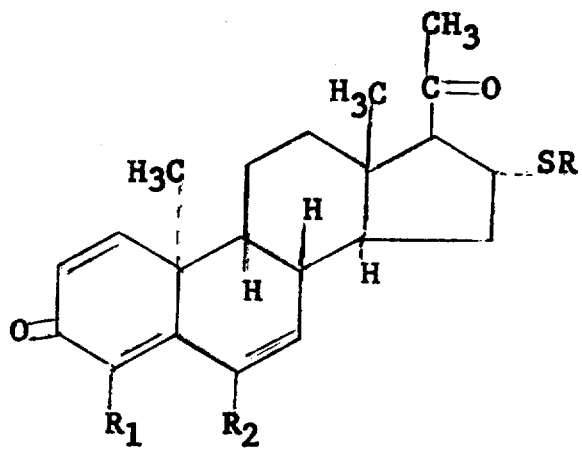

SIGNED AND
SEALED
OCT 13 1970

(SEAL)
Attest:

Edward M. Fletcher, Jr.
Attesting Officer

WILLIAM E. SCHUYLER, JR.
Commissioner of Patents